United States Patent [19]
Schlosser

[11] Patent Number: 4,476,534
[45] Date of Patent: Oct. 9, 1984

[54] FIXED-CYCLE-CONTROLLED FILLING MACHINE

[75] Inventor: Hermann Schlosser, Bad Kreuznach, Fed. Rep. of Germany

[73] Assignee: Seitz-Werke GmbH, Bad Kreuznach, Fed. Rep. of Germany

[21] Appl. No.: 266,923

[22] Filed: May 26, 1981

[30] Foreign Application Priority Data

May 24, 1980 [DE] Fed. Rep. of Germany ....... 3019940

[51] Int. Cl.³ ............................................. G06F 15/46
[52] U.S. Cl. ...................................... 364/479; 141/90
[58] Field of Search ...................... 364/479, 500, 502; 134/166 R; 141/1, 94, 90; 222/47, 52

[56] References Cited

U.S. PATENT DOCUMENTS

| | | | |
|---|---|---|---|
| 2,667,882 | 2/1954 | Gioimo | 134/166 R |
| 3,789,889 | 2/1974 | Riedel et al. | 141/90 X |
| 4,158,545 | 6/1979 | Yamashita et al. | 364/497 X |
| 4,206,788 | 6/1980 | Susaki et al. | 222/47 X |
| 4,207,932 | 6/1980 | Gimour | 141/90 |
| 4,254,460 | 3/1981 | Achter et al. | 364/497 X |
| 4,259,288 | 3/1981 | Welch | 364/497 X |
| 4,271,123 | 6/1981 | Curry et al. | 364/497 X |
| 4,275,822 | 6/1981 | Juffa et al. | 222/52 X |
| 4,281,387 | 7/1981 | Kraft et al. | 364/497 |
| 4,337,608 | 7/1982 | Schlosser et al. | 141/1 X |

Primary Examiner—Edward J. Wise
Attorney, Agent, or Firm—Becker & Becker, Inc.

[57] ABSTRACT

A method and apparatus for operating a filling machine having a stationary part, and movable part provided with filling elements, whereby each filling element has associated therewith at least one electrically actuatable valve and a signal emitter which is actuated by the filling material rising in a filling vessel or container briefly pressed into engagement on the filling element for filling thereof. For the filling elements the operating data are stored in a common electronic control unit connected with the terminals of the signal emitter as well as with the actuating device of the valves of the filling element; during a cycle phase of a timing cycle encompassing all filling elements and running for a predetermined period of time, by means of this electronic control unit, with the filling elements switched ready for operation, the operating conditions of the signal emitter or emitters and of the valve or valves of each filling element are scanned, whereby the predetermined time period amounts to a fraction of the time necessary for the completion of a filling process; and that each time a timing cycle is finished, there begins a new timing cycle, and the data of the operating conditions obtained by the cyclic scanning are stored in the electronic control unit and are compared with the preset operating data, and a possibly necessary signal is emitted to the valve or valves.

13 Claims, 13 Drawing Figures

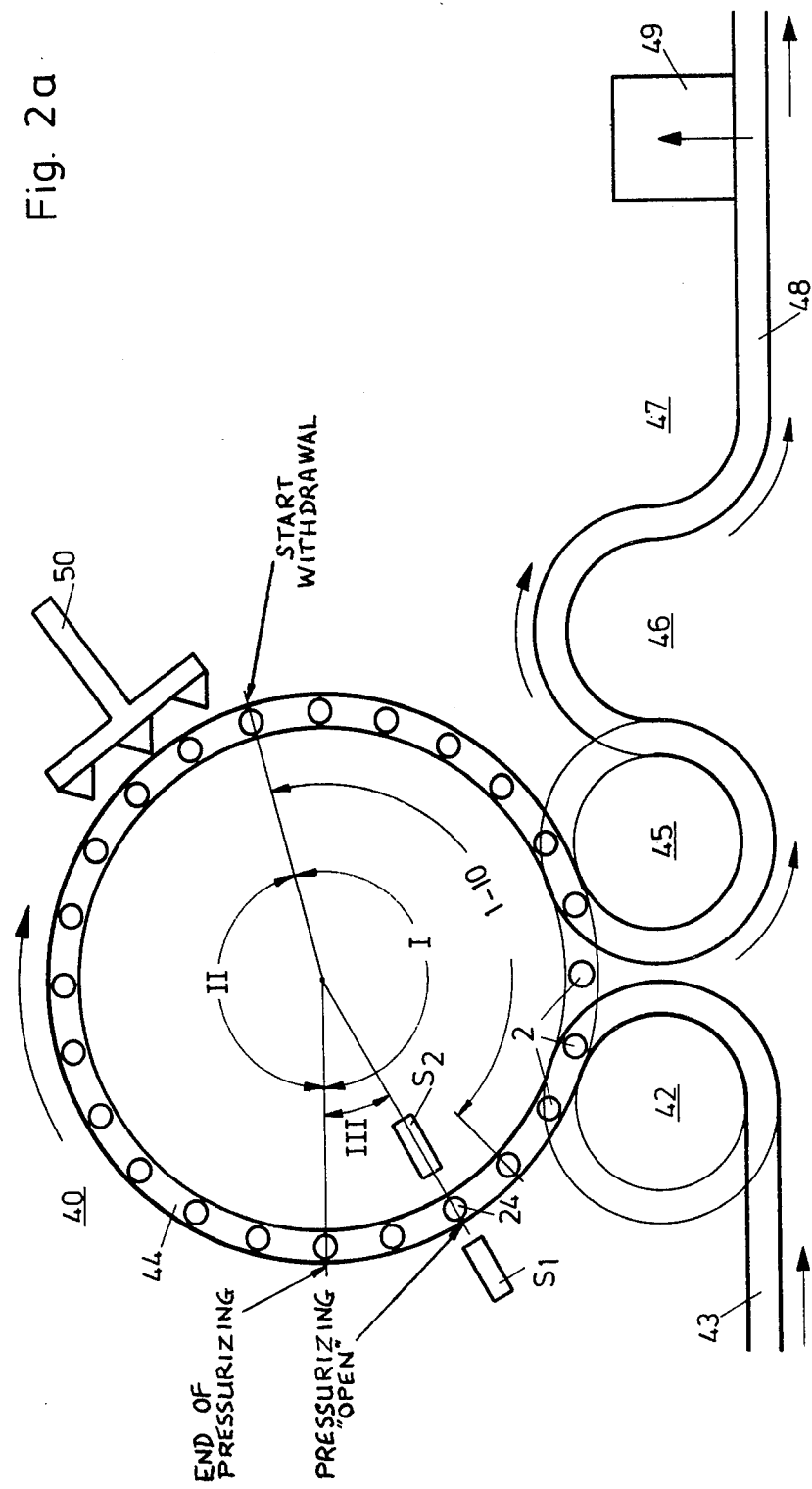

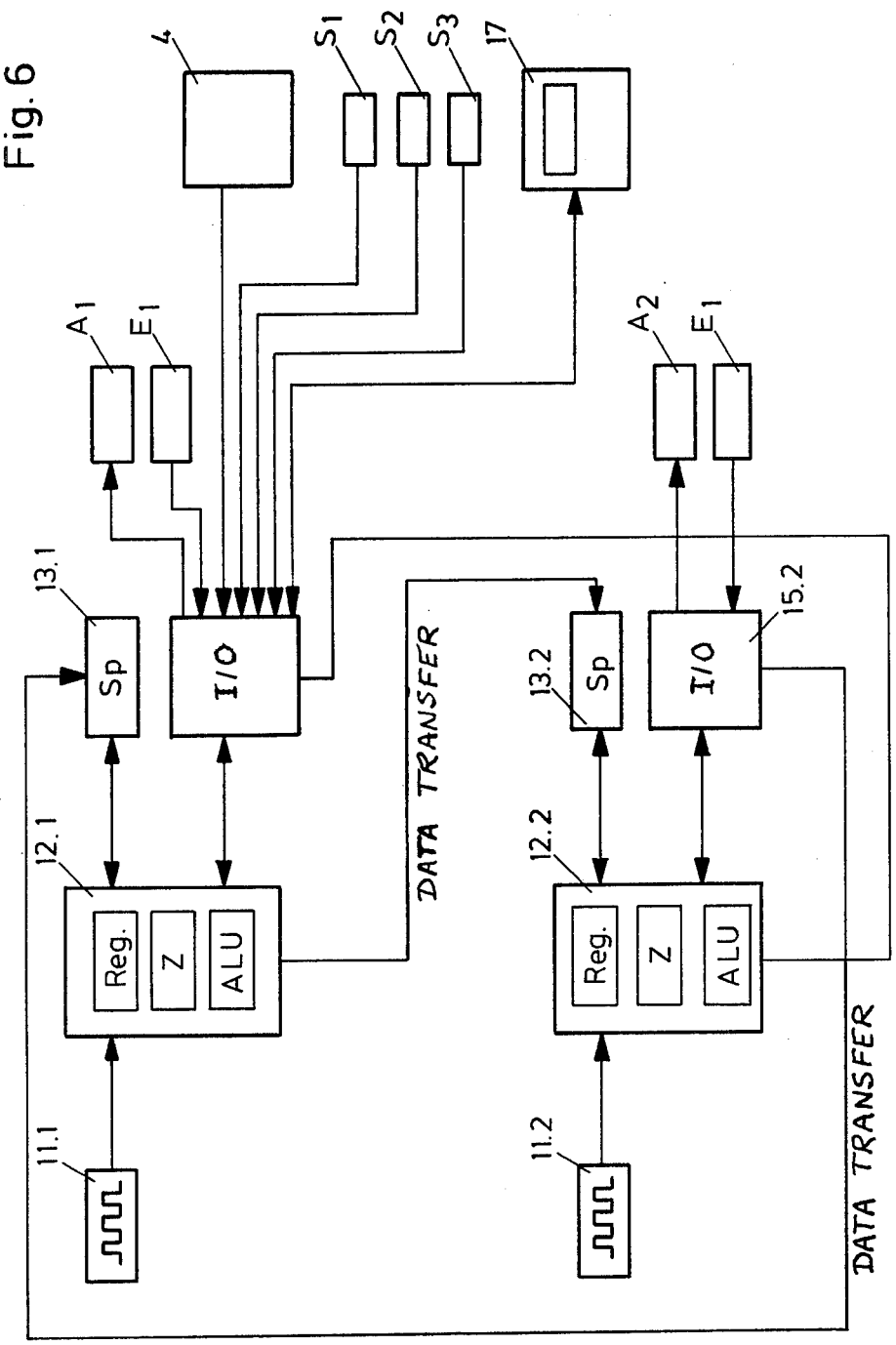

FIXED-CYCLE-CONTROLLED FILLING MACHINE

The present invention relates to a method for operating a filling machine having a stationary part and a movable part provided with filling elements, whereby each filling element has associated therewith at least one electrically actuatable valve and a signal emitter which is actuated by the filling material rising in a vessel or container briefly pressed onto the filling element for filling purposes; the present invention also relates to an inventive apparatus for carrying out this method.

Exactly, safely and microbiologically satisfactorily operating filling machines for dispensing or bottling any filling material require a series of monitoring-, control-, and regulating functions for the plurality of tasks they have to accomplish. Thus, appropriate devices are necessary for a correct filling of the filling containers for cleaning and sterilizing the elements conveying the gas and liquid of the filling machine, and for removing destroyed filling containers. The monitoring, controlling, regulating, and optical indication of the filling and closing processes, to recognize and localize possible interruptions in the countinuous operating sequence, are as important as the operational sequences for the preparation, cleaning, and sterilization of the filling machines.

Additionally, reliably and accurately operating filling elements are a prerequisite for optimum filling results, and consequently for the optimum functioning of filling machines. A filling element of the mentioned type is disclosed for example in German Offenlegungsschrift No. 19 27 821. This filling element for a single- or multichamber counter pressure filling machine contains a filling tube projecting into the pressed-on container and a signal emitter triggering a closing pulse for the liquid flow valve; this signal emitter is influenceable by the liquid level rising in the interior of the container to a predetermined height. If with this filling element, with which only the operating sequences are controlled and, moreover, by an electrical control device associated solely with the filling element, the liquid level rising in the vessel establishes the contact with the signal emitter, while periodically opening a gas outlet valve actuated by a magnet for accelerated return gas discharge, a generated electrical control signal brings about the actuation of an electromagnet included in the valve actuating device. This valve actuating device returns the opened liquid flow valve into the closed position counter to the effect of an opening spring, and maintains the open position until pressurizing of the subsequent vessel. During this vessel pressurizing, the liquid flow valve, which closes under the counter effect of the opening spring, maintains the closed position solely under the influence of the liquid pressure prevailing in the interior of the filling element.

The numerous filling elements of a filling machine, however, have unavoidable deviations in the individual elements. Additionally, different external parameters can influence the bottling process, for example the temperature of the filling material, different types of vessels or containers, and different filling speeds. These deviations and external parameters being about different filling heights in the indivdual containers to be filled. However, it is a goal of each bottling process, aside from a safe and disturbance-free operation of the filling machine, to achieve an accurate and uniform filling of the containers.

Known bottling methods consequently proceed on the basis that at a predetermined point within the container to be filled, for instance a bottle which is located underneath a filling element and into which liquid flows through a suitable filling tube, there is measured whether the liquid reaches the predetermined point, for instance a probe capable of conducting, so that a contact of this measuring device triggers a closing of the liquid flow valve. This method does not take into consideration any differences in the flowing speed of the individual filling elements relative to each other, and no differences of the measuring and response speed of the individual measuring and actuating devices. Furthermore, the expansion coefficient of the liquid to be bottled at different temperatures as well as changes in the viscosity of the liquid are not considered. The constancy of the pressurizing- and filling-pressure must furthermore be taken into consideration with constant-pressure-filling processes.

Furthermore, methods and apparatus for cleaning bottle filling devices after bottle breakage within a filling machine are known, with which, while continuing the machine circulation, the filling machine is freed of glass pieces still in the same rotational cycle by spraying with liquid. Thus, for example, German Pat. No. 926 350 describes a cleaning device on bottle filling machines, which is arranged at a certain location in the circulating path of the filling machine for the filling stations which comprise respectively a bottle filling device including essentially a filling element, a bottle centering means, and a bottle plate or support; the cleaning device also has one or more spray tubes with a plurality of nozzles for the spray liquid and a control for the shut-off valve. The control for bottle filling machines, the filling stations of which are equipped with plates movable upwardly and downwardly and carrying the bottles, comprises in essence a lever which is actuated upon bottle breakage by the bottle plate which is being lifted higher upon a bottle breakage than during normal operation and thus opens the shut-off valve for spraying the filling station with spray liquid.

A similar apparatus is known from German Offenlegungsschrift No. 27 39 742 with which, however, every filling station is provided with its own spray tube. The control with this known apparatus is the same as with the apparatus according to German Pat. No. 926,350, and is effected by the bottle plate which is lifted higher due to a bottle breakage than in normal operation. U.S. Pat. No. 2,667,882 Gioimo dated Feb. 2, 1954 discloses a tubular cleaning device for bottle filling devices leading from below against the filling element, so that spray liquid is sprayed directly against the filling element for effectively cleaning the parts thereof. Practice, however, has shown that all of these known cleaning devices are not sufficient to effectively remove more or less small glass splinters resulting from a bottle breakage from the sensitive functional elements of the bottle filling device. This is true particularly for the filling element with its more or less complicated parts and its liquid conveying paths, which even by a spray treatment with cleaning fluid from the side as well as from below can only be incompletely freed of the more or less small glass splinters. The removal of fine glass splinters is additionally made more difficult when bottling sticky liquids such as juices or sugar-containing beverages which bring about that the fine glass splinters stick to the parts of the filling element. Besides, the monitoring, control, and evaluation of bottle breakages within a filling machine is inadequate with the previously known methods, and does not allow for a precise action or general remedy for preventing continuously occurring bottle breakages with particular types of containers or with a particular filling material.

Accordingly, such method or process steps are necessary for operating a filling machine which take into consideration these influencing factors by way of a simple and effective monitoring, and which correctively influence the working cycle by means of control procedures or closed regulating circuits which short control or regulating delay. The control or regulating procedures must include transfer paths from the stationary part of the filling machine to the rotating part of the filling machine, and vice versa, and must eliminate disturbances in these transfer paths.

It is an object of the present invention to assure safe and simple working cycles, as for example the preparation, filling, cleaning, and sterilizing during operation of a filling machine, by way of a continuous control of the switching and control processes, as well as a gentle handling of the filling material and a high filling accuracy with the smallest possible switching complexity and cost for the entire control and regulating device.

This object, and other objects and advantages of the present invention, will appear more clearly from the following specification in connection with the accompanying drawings, in which:

FIG. 1 shows a block (wiring) diagram for the control of an electrical filling element with an electronic control unit;

FIGS. 2a–2h schematically illustrate the filling and transporting elements of a filling machine for explaining the individual operating cycles;

FIG. 6 is a block (wiring) diagram for the control of filling elements combined into groups with a guide-control unit (lead computer or calculator) and a following control unit (satellite calculator or computer).

Figure 1:
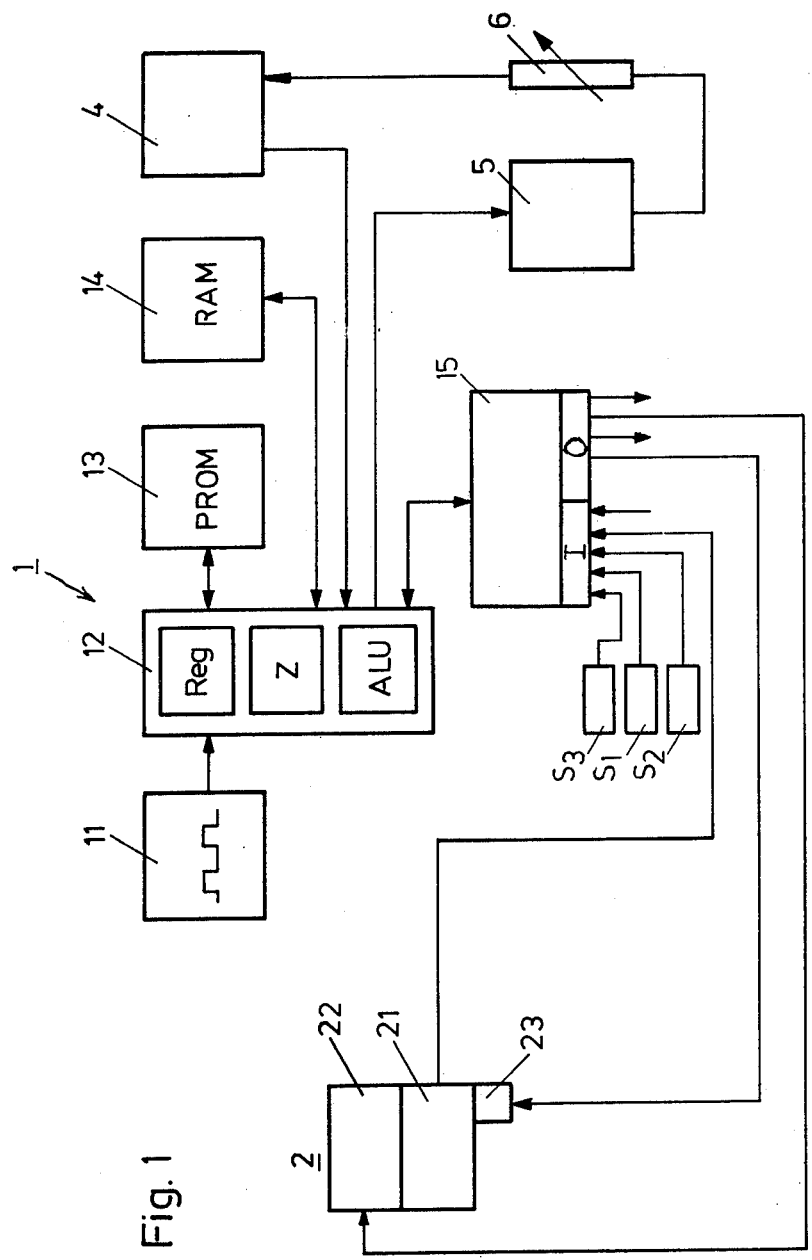

The method of the present invention is characterized primarily in that the various operating cycles of a filling machine, such as the preparing, filling, cleaning, and sterilizing operations, are fixed-cycle control monitored and influenced by an electronic control unit in such a manner that every functional step is divided into a plurality of timing cycles, and that in each timing cycle data are scanned by the signal emitters, are compared with stored data for particular operating conditions, and the various adjusting members, as for instance the filling element valves, filling machine drive, ejector device, filling level control device, and the like, are activated.

The present inventive method assures safe and simple to monitor working cycles during the operation of a filling machine by a continuous control of the switching and control processes while assuring a gentle handling of the filling material and a high filling accuracy with the least possible technical switching complexity and cost for the entire control and regulating device.

A development of the inventive method serving for an optimum filling of the filling vessels is characterized thereby that, for the filling elements, the operating data are stored in a common electronic control unit connected with the terminals of the signal emitter as well as with the actuating device of the valves of the filling elements; during a cycle phase of a timing cycle encompassing all filling elements and running for a predetermined period of time, by means of this electronic control unit, with the filling elements switched ready for operation, the operating conditions of the signal emitter or emitters and of the valve or valves of each filling element are scanned, whereby the predetermined time period amounts to a fraction of the time necessary for the completion of a filling process; and that each time a timing cycle is finished, there begins a new timing cycle, and the data of the operating conditions obtained by the cyclic scanning are stored in the electronic control unit and are compared with the preset operating data, and a possibly necessary signal is emitted to the valve or valves.

According to further advantageous developments of the inventive method for controlling and monitoring the exact filling of a filling vessel, the signals determined and stored during the respective cyclical scanning of each filling element may remain stored independently of the number of timing cycles until completion of the filling process, and then such signals are cancelled.

The signal of a first signal emitter may also be scanned over the signal line of the signal emitter, of one of the filling elements, actuatable by the filling material. The scanning of the first signal emitter may be effected before the signal emitter actuatable by the filling material emits a signal.

The measuring circuit associated with the signal emitter actuatable by the filling material may be continuously turned-on with the ready-switching of the filling elements.

Individual parameters may be preset for each filling element, and may include, for example, the rated value for the rising speed of the liquid in the vessel.

Parameters may be preset in common for all filling elements, and may include, for example, the rated value for the temperature, the filling vessel type, and the liquid pressure.

The parameters may be changed in each timing cycle, and may be taken charge of at the cycle beginning for the started timing cycle. A testing of the parameters for changes and transmission errors may be effected by means of a comparison, to be undertaken by the electronic control unit, with the parameters previously stored.

The transferred or transmitted data of a timing cycle may be tested for transmission disturbances with longer conducting paths by way of a two-of-three-comparison.

The data about the operating conditions of the filling elements may be transmitted from the timing cycles for forming a closed control circuit for a control regulating device, for instance a pump, associated with the filling machine in the stationary part or externally of the filling machine, and/or to a control device, for instance a data viewing device.

The number of filling elements of a filling machine may be divided into at least two groups of N-filling elements, with several groups being worked synchronously.

For the filling elements or the filling elements of all groups, the following three time data blocks, which are applicable for a cycle or pulse phase of a filling element, or for a timing cycle, may be preset:

$B_1$ = time from the start of filling until the beginning of the rapid filling;

$B_2$ = time from the start of filling until the end of the rapid filling;

$B_3$ = time from covering or occupying of the signal emitter until closing of the liquid flow wave of the filling element.

The time data blocks $B_1$ and $B_2$ may be added and preset as a common time data block, whereby $B_2$ may be increased by a factor oriented as to the shape and content of the respective vessel, and the sum of $B_1$ and $B_2$ does not exceed a value lying within the total filling time.

The duration of a timing cycle may be considered as one time pulse, and the next time pulse may be given during the renewed handling of the associated filling element, whereby the number of time pulses represents the time actual value.

After actuation of the signal emitter which is actuatable by the filling material, the liquid flow valve is closed with time delay along with the supplying of a correction factor. The correction factor may be individually associated with each individual filling element. The correction factor may also be associated in common with all filling elements of the filling machine. The correction factor in each individual filling element may be associated with one or more correction factors for other correction tasks.

The one or more correction factors for other correction tasks may be provided in a partial region associated individually with each individual filling element, and the first correcton factor may be provided in a partial region common to all of the filling elements of the filling machine. The correction factor partial regions may be changed as a function of external parameters.

The operating conditions of the filling elements scanned in one timing cycle may be stored, and from them operating data for the end of the filling procedure may be determined in the electronic control unit. Operating data for each individual filling element, as well as operating data for a group of filling elements or for all filling elements, may be fed to the electronic control unit, and such operating data are considered with the arithmetic or logic operating steps of the electronic control unit for determining the end of the filling procedure for each individual filling element.

The asynchronous operating data fed to a one-way data channel may be synchronized by means of a presettable low number of pulses of a working cycle, and may be stored for comparison and calculating operations.

By means of a further presettable low number of pulses of a working cycle, operating data synchronized and determined by the electronic control unit over a two-way data channel may be scanned for determining the partial filling condition, of each individual filling vessel, reached in the stationary part of the filling machine.

The fixed-cycle controlled electronic control unit may give off synchronization signals to other control units designed in the same manner, and may receive and process synchronization signals delivered from these control units.

The filling elements of the filling machine may be subdivided into at least two groups, with each group being handled independently in a fixed-cycle controlled manner, and the cycle beginning of all fixed-cycle controls being synchronized.

All fixed-cycle controls which are synchronized with each other and are provided for control of the filling machine, may be provided with operating data preset in common, and operating data obtained separately in segments from at least one additional signal emitter.

The operating data delivered from the fixed-cycle control of each of the groups of the filling machine may be combined into a common operating signal and supplied to one or more control circuit members and/or one or more controls or registering devices.

Upon association of only one signal emitter to a filling element with several valves, during scanning the position of the filling element relative to the pressurizing zone of the filling machine may be taken into consideration.

The position of the respective filling element relative to the pressurizing zone may result by scanning the signal emitters which determine the position of the filling element.

With a rotating filling machine, the determination of the position of the respective filling element with respect to the pressurizing zone may result by means of a signal emitter which registers each circulation of the filling elements and is arranged at the beginning of the handling zone on the stationary part of the filling machine, and by means of a control device which determines the distance of the respective filling element relative to the beginning of the pressurizing zone.

The time-data blocks $B_1$, $B_2$, $B_3$ for the valve evaluation may be introduced at a time point when the valves to be influenced thereby are inactive.

For the filling elements or filling elements of all groups, time data blocks may be respectively preset as follows for the pulse phase of a filling element or for a timing cycle:

$B_{1a}$ = time from the start of filling until the beginning of the first rapid filling;

$B_{1b}$ = time from the start of filling until the end of the first rapid filling;

$B_{1c}$ = time from the start of filling until the beginning of the second rapid filling;

$B_2$ = time from the start of filling until the end of the rapid filling;

$B_3$ = time from covering or occupying of the signal emitter until closing of the liquid flow valve of the filling element.

A method for monitoring and registering filling container breakage as well as for controlling the elimination of remnants of the vessels and of the filling material is characterized by the following combination of features;

(a) A registering and storing device, which is synchronously connected step-for-step with the circulation path of the rotating part of the filling machine in the manner of a shift register, having a number of register locations and storage means corresponding or adjustable to the number of filling elements in circulation;

(b) A feeler or sensing device, arranged on the rotating part and on the filling element circulation path of the filling machine, with feeler elements which respond to a filling vessel breakage and enter a filling-vessel-loss marking in the register and storage device;

(c) An ejecting device in the region of the discharge element of the filling machine which when actuated ejects or separates one filling vessel from the row of filling vessels leaving the filling machine;

(d) A counting chain of relays with that number of counting locations having storage elements which corresponds to an integral multiple of the number of filling elements in circulation, increased by the necessary feeding or advancing steps between the arrangement of the sensing or feeling element and the arrangement of the ejecting device;

(e) The counting chain of relays is connected to the registering and storing device for taking over information, and is connected to a switching device for emitting switching pulses in the feeding or advancing step spacing between the feeding device and the ejection device, and this switching device in turn actuates the ejection device.

By equipping the filling machine with a registering and storage or memory device, for receiving information about the vessel loss and for transmitting this information to a counting chain of relays, as well as with an ejection device controlled by the counting chain of relays, there can be assured an effective monitoring, even with large filling machines, particularly counter pressure filling machines, so that with each occurring vessel breakage the subsequent elimination of the vessels filled in the particular filling elements occurs for rinsing the filling device. This device or apparatus is also still effective with complete certainty when a breakage of vessels occurs relatively often, and even when a further breakage of a vessel occurs in exactly the same filling element, and there has not yet even been terminated the subsequent discharging or elimination of the vessels filled in this filling element. With the integration into the central control unit there is provided by this method a simple possibility for monitoring and registering or recording a vessel breakage as well as for the disposal of remnants of the vessel and of the filling material.

A system or arrangement for carrying out the inventive method is characterized primarily in that the signal emitters of the stationary part of the filling machine, and the signal emitters of the filling elements, are connected with the fixed-cycle control of an electronic control unit, and that the electronic control unit is connected with the adjusting members of the stationary and rotating parts of the filling machine for ascertaining the respective state or condition and change of condition.

The working of the individual signal emitters connected with the electronic control unit occurring in timing cycles, as well as the loading of the indivudial adjustment members with signals given off by the electronic control unit, make possible an accurate and uniform filling of the vessels, also when taking into consideration sample deviations in the individual filling elements of a filling machine and when taking into consideration the external influences arising during the bottling process, at extremely small switching-technical complexity and costs for the entire control device as well as an exact and always monitorable cycle of all operating steps of the filling machine.

The utilization of a fixed-cycle-controlled electronic control unit assures for all working steps an extremely great accuracy of the individual operating steps depending upon the timing cycle and the number of individual working cycles. Consequently not only the accuracy of the bottling process is increased, but also possible defects are recognized and detected early enough and eliminated, and consequently the safety of the entire system is increased.

The utilization of one or more synchronously operated fixed-cycle controls cyclically scanning all signal emitters belonging to one filling element and the pertaining output elements, reduces the time lost in disturbances to a minimum. If furthermore a timing cycle, which means the time for processing all electrical states of a definite number of filling elements, is kept so small that a few hundred such timing cycles can occur during the filling process, there results a very fine time or scanning pattern in which an inaccurate step has as a consequence only a small partial inaccuracy. Since in each fixed-cycle control the processed steps for one filling element must lead to output signals, which must be stable during the processing time of the other filling elements, there must occur a storing of the output signals. If several output signals following each other are stored for each filling element, reference data exist for a trend calculation to be still further evaluated or analyzed.

If these reference data are compared with the preset operating data, it is possible with the aid of certain arithmetical operations to make a clear statement about the end of the filling of the particular vessel.

If the scanning pattern given by the timing cycle is so narrow or limited that the loss of one or more cycles of a working cycle has only a negligibly small effect upon the filling level or height accuracy for each filling vessel, a certain number of cycles within one working cycle can be taken out of the filling height control and can be used as a transfer cycle to an external mathematical logic. In this case, signals entering synchronously, especially the preset operating data, are to be synchronized with the control pulse. Synchronously with the control pulse, the signal emitter must be scanned and the return signals necessary for the formation of a closed control circuit must be emitted. An external mathematical logic provided for this purpose prepares these signals and transmits the same to the control or indicating devices provided for this purpose.

If within a filling machine a plurality of filling elements must be controlled so that the operating scanning pattern for each filling element becomes too large, inventively several fixed-cycle controls operating independently of each other can, in groups within the rotating part of the filling machine, take over the control of a limited number of filling elements. At the beginning of the timing cycle and/or at the end of the timing cycle there must, however, be undertaken a synchronization of the different fixed-cycle controls.

According to further features of the inventive arrangement, the electronic control unit for determination of the condition and change of condition of the filling elements, may be connected with the liquid flow valves thereof and selectively with further control valves, for example gas outlet valves of counter-pressure filling machines.

The electronic control unit may be connected with a regulator by way of two-way data channels, and an operating data emitter may be connected to the input side of the control regulator, and an adjustment member may be selectively connected to the output side.

Every signal emitter influenceable by the filling material may be connected by way of a measuring circuit with the electronic control unit, and a further signal emitter and also a frequency generator intended for all measuring circuits of the filling elements may be connected to the measuring circuit.

Not only the respective measuring circuit, but also the actuating device of the valves of the filling elements, may be connected with the control unit by means of an opto-coupler.

The adjustment member may be connected with the electronic control unit by means of a parameter member to preset determinable individual parameters or constants, including for example time constants.

At least one signal emitter for all filling elements may be arranged in common in the stationary part of the filling machine, and this signal emitter, by means of an opto-electronic or high frequency signalling or similar signals, transmits the particular filling level in the vessel to be filled, and/or the filling speed, to a measuring section formed by at least two signal emitters.

At least one signal emitter may be arranged at each filling element in the rotating part of the filling machine, this emitter being responsive continuously or to a particular determinable filling level, and projecting into the vessel which is to be filled and being briefly pressed onto the filling element.

The measuring points of the signal emitter in the stationary part of the filling machine may be dependent upon the rotational speed of the rotating part of the filling machine.

The signal emitters associated with the individual filling elements in the rotating part of the filling machine can be an independent measuring section and/or reference points of an integrated measuring section.

The signal emitters are conductivity probes or probes for continuous measurement of the filling level, or operate according to thermal effect.

The control elements which determine the final filling level may comprise time delay members which are selectively variable or fixedly adjustable, and are connected individually or in series.

Referring now to the drawings in detail, the block diagram illustrated in FIG. 1 for the control of electrically controlled filling elements shows one filling element 2 of a plurality of filling elements of a rotating counterpressure filling machine not illustrated in detail. The filling element 2 contains a signal emitter, responding to the filling height in the vessel, in the form of a probe 21 introduceable into the vessel, a magnet 22 of the actuating device for the liquid flow valve, as well as a magnet 23 for the actuating device of a gas outlet or discharge valve for an accelerated return gas withdrawal. The probe 21 delivers its measuring data to an electronic control unit 1. This electronic control unit includes a fixed-cycle control as well as a control and calculating mechanism, and is in direct alternating or two-way connection with an input or detecting member 4 for particular individual parameters. The electronic control unit 1 is connected on the output side with the magnets 22 and 23 of the filling element 2.

The electronic control unit 1 is divided into a cycle or pulse generator 11, a central processor or a control/calculator mechanism 12, a programmable constant-value memory (PROM) 13, a recording/reading-memory (RAM—random access memory) 14, as well as an input-/output-control 15. The programmable constant value memory 13, the RAM 14, as well as the input-/output-control 15 are connected by two-way data lines with the central processor 12, which is controlled by the pulse generator 11. The signal emitter 21 mounted on the filling element 2, as well as three further signal emitters $S_1$, $S_2$ and $S_3$, are connected with the input of the input-/output control member 15, which in turn on the output side is connected both to the control magnet 22 for the filling element 2, and also to the magnet 23 for the actuating device of a gas outlet valve. Also provided is a control circuit connection between the central processor 12, a regulator or control 5, an adjustment member 6, and the member 4 for delivery of the outer parameters. The signal emitters $S_1$ and $S_2$ serve to determine the filling element, provided only with the signal emitter 21 and the magnets 22, 23 for the valves, in its particular position relative to the pressurizing zone. With a rotating filling machine, this determination of the particular position of the filling element occurs in every circulatory cycle of the machine, so that the scanned data are allotted positionally to the respective filling element.

Further filling elements of a particular group, or all filling elements of a filling machine, are connected to the input-/output control member 15 of the electronic control unit 1 in the same manner as the illustrated filling element 2. All filling elements are cyclically handled by pulse control by the electronic control unit 1. The filling process for each individual filling vessel below a filling element is divided into a large number of timing cycles, and in each of these individual timing cycles the data relating to the actual filling condition are scanned by the signal emitters $S_1$, $S_2$, 21 or 7, 21 (FIG. 3), and these data are compared with stored data for particular operating conditions, and a signal that may be necessary is emitted to the magnets of the valves of the corresponding filling element. Since in fixed-cycle control the particular sequence being processed for a filling element must lead to output signals, which are stable during the processing time of the other filling elements, data must be stored in the electronic control unit. When several sequentially following operating data are stored for each filling element, reference data are available for a trend computation. When these reference data are compared with the preset operating data, it is possible with the aid of arithmetic or logic operations to make a clear statement about the end of the filling of the particular filling vessel. If the time scan is so limited during the cyclical processing of the filling elements that the loss of one or more cycles in a working cycle has only a negligibly small effect upon the filling height accuracy, a small number of cycles can intentionally be taken out of the filling level control within a working cycle and can be used as transfer cycles. Accordingly, a small number of cycles of a working cycle is used for the purpose of synchronizing the asynchronous preset operating data arriving from the stationary part of the filling machine on a one-way data channel and making them ready for comparison and calculating or computing operations. A further small number of cycles of the working cycle is used for the purpose of requesting synchronous information on a bidirectional data channel about the partial filling condition of each individual filling vessel sensed or detected in the stationary part of the filling machine, or to send synchronous data to a control device arranged in the stationary part of the filling machine, to thereby form a closed control circuit. Additionally, synchronization signals are sent to other identical cycle controls with subdivision of the individual filling elements into groups; from these other groups synchronization signals are received and further processed. The subdivision of the filling elements into groups becomes necessary when a plurality of filling elements is to be controlled within a filling machine, and consequently the time scanning pattern for the processing of the individual filling elements becomes too approximate. In this situation, several independent fixed-cycle controls can in groups take over the control of a limited number of filling elements. With this subdividing, however, as already described, a synchronization at the beginning of the cycle or at the end of the cycle is necessary.

Since the individual phases of the filling process in a filling vessel take different lengths of time—thus, for example, the time from reaching a lowered or set back end control mark to the end of the filling is far shorter than the time for the beginning of filling until reaching the end control mark—with filling elements combined in groups certain filling element groups lie in the shortest processing range and other filling element groups lie in the longest processing range. It is therefore necessary to allot an identical period of time to all filling processes, and to complete the control process suitably with waiting intervals or loops in order to attain a continuous filling picture. These control steps will be described in greater detail in connection with the illustration of FIG. 5.

Figure 2B:
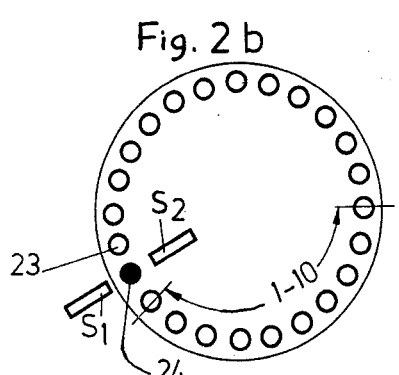

To explain the inventive fixed-cycle-controlled sequence of operations in a filling machine, FIG. 2a shows a plan view of a rotating counterpressure filling machine with a closure device following the circulatory path, while FIGS. 2b through 2h illustrate the path of a filling element through the filling machine.

The filling machine 40 illustrated in the embodiment of FIG. 2a is provided for example with twenty-four filling elements 2 which are guided in a clockwise circulatory path 44. The empty filling vessels or containers are supplied one after the other by a transporting device 43 via an inlet star 42 to a filling element 2, and while staying with this respective filling element 2, are guided along the circulating path 44 until reaching a discharge star 45. Following the star 45 is a closure machine 46 equipped with a discharge star 47 and a conveyor 48 for transporting away the filled bottles. A schematically illustrated ejecting device 49 is arranged on the conveyor 48; this ejecting device 49 can have any suitable embodiment. The transporting path of the vessels is indicated by arrows in FIG. 2a, while the ejection or discharge of the separated out vessels occurs in the direction of the arrow shown at the ejecting device 49. The special construction of the filling machine 40, the closure machine 46, and the ejecting device 49 can be made in any suitable known manner. Important for the fixed-cycle control of the filling machine, however, is that the filling machine 40 is equipped with a plurality of filling elements 2 continuously circulating in the circulating path 44, of which each filling element 2 can take up a filling vessel or container to be filled; and that the sequence of the filling vessels given by the filling elements 2 is maintained through the discharge star 45, the closure machine 46, its discharge star 47, and the path 48 for transporting away the vessels as far as to the ejection device 49. If any gaps arise in the line-up of vessels in the filling elements 2, whether by leaving a filling element 2 empty at the inlet star 42 or by breakage of a filling vessel in one of the filling elements 2, these gaps are detected and indicated by the inventive control unit; however, these gaps remain in existence as far as to the ejection device 49.

For treating the filling elements 2 with pressure water, a spray device 50 is rigidly arranged in the region of the circulating path 44 of the filling machine 40, in which the vessels to be filled are acted upon by compressed gas. The spray device 50 expediently comprises several nozzles and release elements installed in one or more spray tubes, and these nozzles and elements, scanned by the electronic control unit, release temporary spray jets when a vessel breakage occurs. The spray jets which are directed essentially against the liquid outlet at the filling element, the filling vessel centering means, and the filling vessel support plate, eliminate glass fragments and splinters adhering to these components.

The filling machine circulation path can be subdivided essentially into three parts I, II and III. Part I begins with the withdrawal zone and terminates at that filling element which leaves the pressurizing zone. Part II comprises the entire filling zone, while part III comprises the pressurizing region beginning at the signal emitters $S_1$ and $S_2$, whereby the signal emitters $S_1$ and $S_2$ expediently are arranged on the stationary part of the filling machine.

Figure 2C:
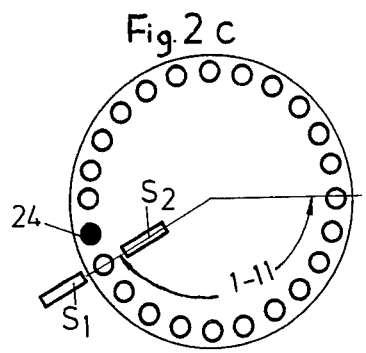

The working sequence of a filling element 2 is set forth in greater detail in the illustrations of FIGS. 2b through 2h. If, for example, the filling elements 1-10 and 23-24 are in the part or region I, and if in this region the filling element 24 is located under the control stand "pressurizing open" and the cam at the inlet star 42 simultaneously releases the pertaining signal emitter $S_1$ for the machine cycle, the valves numbered 23, 24 and 1-10 are positively closed. The signal emitter $S_2$, actuated for example by a cam arranged at the filling element 24 and registering the respective machine circulation at this point of time, and the signal emitter $S_2$ detecting the given spacing of the individual filling elements 2, are simultaneously occupied (FIG. 2b). The running-off side of the signal of the next machine cycle shifts or displaces the position of the closed filling elements by one place or position. Then the filling elements 24 and 1-11 are positively closed (FIG. 2c). From this explanation, it is clear that this working sequence represents a kind of shift-register function. Since the rising side of the signal has no effect, which means is not accepted by the fixed-cycle control, it is attained that in each timing cycle the signal transmission is active only very briefly. Possible disturbances remain without any effect during the remaining time. Accordingly, a disturbance suppression of 1:20,000 is attained. With corresponding programming of the electronic control unit, there can also be positively closed in the filling operation only the filling elements in the pressurizing zone and two filling elements in the withdrawal zone, while the liquid flow valves of the remaining filling elements in the region I remain closed by the liquid pressure. Consequently, the energy consumption can be reduced considerably.

Figure 2D:
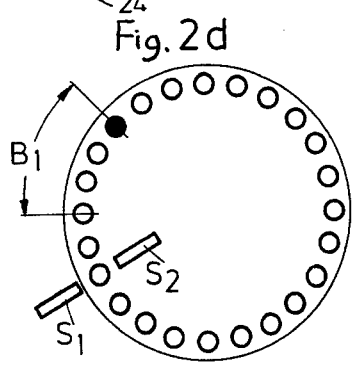
Figure 2E:
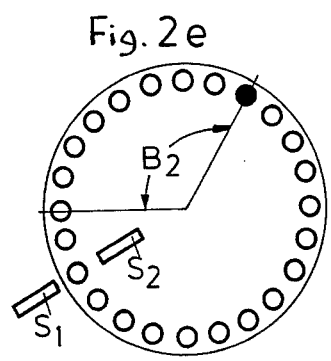

Different preparatory operations are carried out in the region I for the region II, which are described in the following paragraphs:

In the filling angle region II, the gas outlet valve of each filling element is opened, after running through a preset time-data block $B_1$, for the beginning of a rapid filling and, after running through a further prescribed time-data block $B_2$, such valve is closed again for termination of the rapid filling (FIGS. 2d and 2e). In this case, the time-data blocks $B_1$ and $B_2$ can be added and can be preset as a common time-data block; whereby, however, $B_2$ must be multiplied by a factor taking into consideration the shape and content of the filling vessel, if the sum of $B_1$ and $B_2$ should exceed a value lying within the entire filling time. For the purpose of letting a quieting occur during the rapid filling, the rapid filling of the filling elements or of the filling elements of all groups can occur in a first and second segment, for which the following time-data blocks are preset:

$B_{1a}$ = time from the start of filling until the start of the first rapid filling;

$B_{1b}$ = time from the start of filling until the end of the first rapid filling;

$B_{1c}$ = time from the start of filling until the beginning of the second rapid filling;

$B_2$ = time from the start of filling until the end of the rapid filling;

$B_3$ = time from occupying of the signal emitter 21 until closing of the liquid flow valve of the filling element 2.

Operating preset or advance control data are set or adjusted in the stationary part of the filling machine by means of potentiometers. Since the potentiometers are variable at any time, which means they can be changed also while a filling process is in progress, this would lead to multiple switchings of the gas outlet valve and thus would result in filling height inaccuracies. A priority logic provided in the electronic control unit precludes this condition thereby that only in a region, in which the gas outlet valve is inactive, can there be taken over the operating advance or preset data. The operating advance data, once calculated and transferred, remain unchanged for the running filling process of a filling element defined by the shift-register position until the termination of the filling process. Also disturbing influences upon the transfer paths are eliminated. The filling angle region II begins for each filling element after leaving the pressurizing zone, whereby in this region all functions are independent of the rotational speed of the filling machine. First also here a priority logic becomes effective and transfers the operating preset data for a necessary filling height correction only in a region in which the liquid flow valve circuit is still inactive. The operating preset data consist of a correction factor common for all filling elements, and a correction factor specifically allotted for each filling element, and these two correction factors can be added linearly. Such a dividing up of the correction factor for different corrective objects can become necessary when different outer parameters are effective upon the filling process, whereby these outer parameters arise at the individual filling elements in a different manner and magnitude. It is then, in further development of the invention, expedient to change or vary certain correction factor-partial ranges dependent upon the larger parameters. An individual parameter preset individually for each filling element consists, for example, in the rated value for the rising speed of the liquid in the filling vessel. Parameters common for all filling elements, which can be preset by way of common correction members, are for example rated values for the temperature, the type of bottles, and the liquid pressure. The correction factors $t_v$ individually associated with each filling element can be programmed-in freely in accordance with the respective apparatus with a running filler, and remains available for a longer time even upon failure or lack of the supply voltage.

Figure 2F:
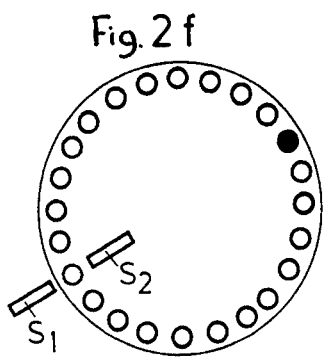
Figure 2G:
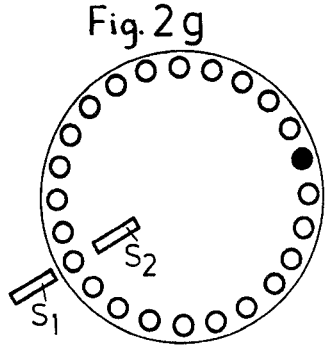
Figure 2H:
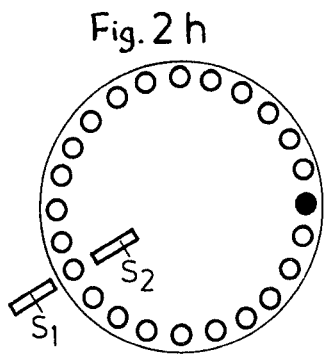

In exceptional cases, it is possible that the rapid filling time of the filling vessel has not yet been concluded, though the permissible filling height has already been reached, for example with desired rapid filling with non-sensitive filling material. In such a case, the correction factors cannot be allowed to delay the termination of the filling process. Corresponding blocking means in the electronic control unit preclude this situation. If, however, a correction factor is effective, combined factors, such as position of the potentiometer, temperature, and individual correction, can become effective, depending on the device or apparatus. Naturally, in the filling region II, a filling process must have been terminated within a flexible time period. This, however, under the condition that the filling process could occur at all, from which the condition can be derived that the filling vessel was in the pressurizing zone. The signal that the filling station is occupied with a filling vessel is transmitted to the fixed-cycle control by an external logic. In a normal situation, for each individual filling element a function control can be carried out over the time tolerance and can be transferred into the stationary part of the filling machine. In contrast to this normal situation, a filling vessel can break in the filling zone. A filling vessel counter in the discharge star 45, however, detects the missing filling vessel, and this situation can be eliminated by a sum or total comparison. Likewise, by way of a total comparison with a filling height control, there is still possible far behind or after the filler a localization of the faulty filling elements. FIG. 2f illustrates the point in time at which the respective filling element is scanned by the fixed-cycle control to find out whether the signal emitter projecting into the filling vessel is occupied. Possible deviations are reported back, corrections are carried out (FIG. 2g), and the control magnet for the liquid flow valve is closed (FIG. 2h).

Analogous to the described filling operation, the operating steps of the filling machine, including cleaning and sterilizing the parts conveying the gas and liquid, are carried out by the fixed-cycle control. Tap water is passed through the filling elements to the outside during the clear-rinsing process. The liquid flow valves must be closed between the withdrawal zone and the end of the pressurizing zone. Within the filling-angle region II there must be opened precisely so many liquid flow valves that an optimum flow speed is attained, without attaining too high a pressure rise in the liquid container of the machine, whereby all valves are closed. For this purpose, a pressure sensing device with a signal emitter $S_3$ (FIG. 6) in the liquid container automatically sets or controls the "rinsing angle". This condition is requested and obtained by the fixed-cycle control by way of a corresponding external signal.

During a cyclical cleaning, the filling elements are closed to the outside by rinsing jackets or sleeves, so that the signal emitters 21 are continuously occupied. Even then, the liquid flow valves cannot be permitted to close. A program segment is selected which fulfills the requirement that the liquid flow valves do not close by way of a corresponding signal, for example by turning-off one of the data blocks $B_1$ or $B_2$ or $B_3$. The signal emitter $S_3$ in the liquid container of the filling machine emits measuring values which are digitalized within the electronic control unit for carrying out the program sequence "seek rinsing angle". The measuring data consequently can be used as actual values for a differential pressure control (pressurizing pressure:filling pressure), so that a closed control circuit is formed.

Referring to the detailed circuit diagram illustrated in FIG. 3, for a plurality of filling elements, whereby for all filling elements there is shown one filling element 2 as representative, there will now be described in detail the construction and function of the fixed-cycle control for the filling elements or the filling elements of all groups.

A switch 7, which is switched operative or effective during the pressurizing zone, as well as a probe 21, are secured to the filling element 2. The liquid resistance 8 is additionally represented by dash lines. The output of the probe 21, and that of the remaining probes of the further filling elements of the rotating counterpressure filling machine, are connected with a frequency generator 9. Additionally, the output of the probe 21 and that of the remaining probes are connected respectively by way of a differentiating and integrating member 10 to the input of a probe amplifier 31 respectively associated with one probe, and this probe amplifier 31 in turn is connected by way of a potentiometer 33 with the input of a correction amplifier 32. The output of this correction amplifier 32 in turn is connected by way of an optocoupler 100 with a first section 101 of an pulse generator means 101, 102. Without changing the construction and function of the fixed-cycle control, the signal of a shift register controlled by way of signal emitters $S_1$ and $S_2$ can be connected to the output of the probe 21 in place of the switch 7. Furthermore, the correction amplifier 32 and the potentiometer 33 can be replaced by a programmable correction unit.

Figure 3:
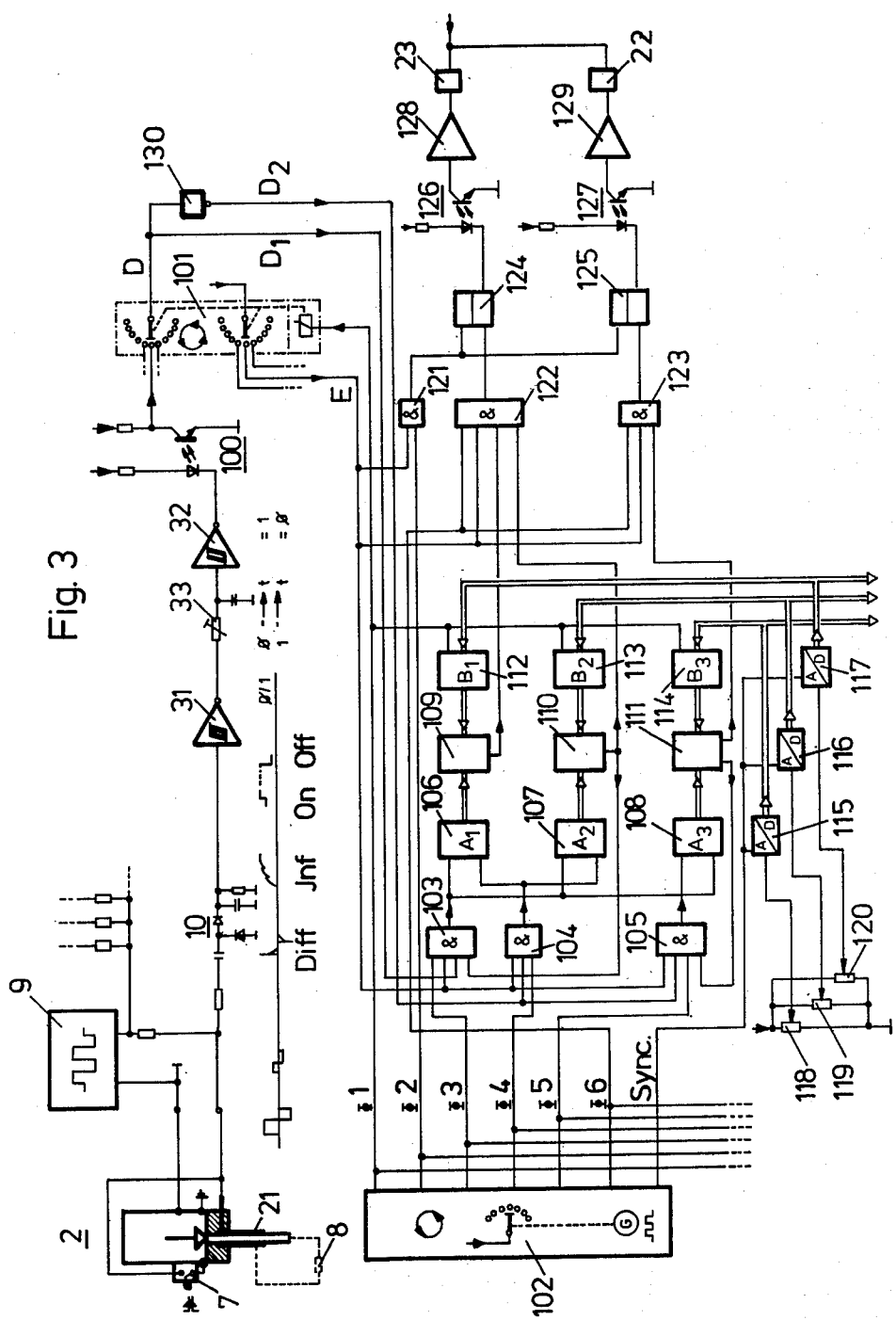
FIG. 3 is a detailed illustration of the block diagram according to FIG. 1, divided into individual logic functions.

Of the plurality of filling elements of the rotating counterpressure filling machine in the embodiment of FIG. 3, the filling elements are divided into several groups, whereby a pulse generator 101, 102 is allotted to each group of a selectable number of filling elements. This first portion 101 of the pulse generator 101, 102, controlled by the signal $\Phi_1$ of the second portion 102 of the pulse generator 101, 102, switches from one filling element of the group to the next filling element, so that an operating cycle encompasses all filling elements of one group. The several groups of the filling elements of the counterpressure filling machine accordingly are cyclically processed independently of each other, in which connection the beginning of the cycle and the end of the cycle of the independent fixed-cycle control for each individual group are brought into mutual agreement or synchronization by synchronizing means.

The operating cycle of a group progresses in such a manner that sequentially each filling element is operated in individual cycle phases by way of the connection with the output of the probe 21 through the optocoupler 100, whereby the individual cycle phases are preset by the second portion 102 of the pulse generator 101, 102, which scans the individual operating conditions. The signals E and D are applied to the ouput of the first portion 101 of the pulse generator 101, 102, whereby the signal D is passed once over a negation member 130. The signals E and D1 or D1 (negated) are applied to the inputs of three AND-gates 103, 104, and 105. Additionally, further inputs of these AND-gates 103, 104, 105 have applied thereto condition parameters $\Phi_3, \Phi_4$ and $\Phi_5$ given off by the second portion 102 of the pulse generator 101, 102. This second portion 102 of the pulse generator 101, 102 controls the following operating conditions:

$\Phi_1$ connection of the particular filling element to be processed to the electronic control unit and taking over the preset data B1, B2, B3;

$\Phi_2$ signal output to the magnets 22 or 23 for closing the liquid flow valve and the gas outlet valve;

$\Phi_3$ comparison of the time-rated values and time-actual values with non-occupied probe for the purpose of turning-on or turning-off of the magnet 23 of the gas outlet valve, if necessary addition of an actual-value-time-cycle pulse;

$\Phi_4$ cancellation of the time-actual values for the magnet 23 of the gas outlet valve with occupied probe;

$\Phi_5$ comparison of the time-rated-values and time-actual values with occupied probe for the magnet 22 of the liquid flow valve, if necessary addition of an actual value time cycle pulse;

$\Phi_6$ signal output to the magnet 22 or 23 of the gas outlet valve or liquid flow valve for maintaining the closure positioning or for re-opening;

SYNC synchronization line for receiving or taking over new parameters.

The signals $\Phi_2$ or $\Phi_6$, together with the output signal E of the first portion 101 of the pulse generator 101, 102, are introduced or applied to three further AND-gates 121, 122, 123, to which additionally output signals are supplied from three reference or comparison members 109, 110, 111. These comparison members 109, 110, 111 are engaged by or have applied thereto the outputs of three actual value members 106, 107, 108, or three rated value members 112, 113, 114. The inputs of the three rated value members 112, 113, 114 of each filling element of the group are respectively connected to the output for the signal $\Phi_1$ at the second portion 102 of the pulse generator 101, 102. For the further filling elements of the group there are likewise connected to the output of the signal $\Phi_2$ the AND-gates 121 thereof; to the output of the signal $\Phi_3$ there are connected the AND-gates 103 thereof; to the output of the signal $\Phi_4$ there are connected the AND-gates 104 thereof; to the output of the signal $\Phi_5$ there are connected the AND-gates 105 thereof, and finally to the output of the signal $\Phi_6$ there are connected the AND-gates 122 and 123 thereof. While the actual-value members 106, 107, 108 are cyclically engaged with or have applied thereto the outputs of the three AND-gates 103, 104, 105, there are connected to the inputs of the three rated value members 112, 113, 114, allotted to the representatively illustrated filling element 2 and connected with the digital outputs of the three analog-digital converters 115, 116, 117, the inputs of the three rated value members 112, 113, 114 of each of the filling elements of the group.

The three analog-digital converters 115, 116, 117 in contrast are associated in common with all filling elements of the group. Additionally, the inputs of the three rated value members 112, 113, 114 have the cycle signal $\Phi_1$ applied thereto which switches to the respective next filling element to be processed. The analog inputs of the three analog-digital converts 115, 116, 117 are connected to three potentiometers 118, 119, 120 which serve for setting or adjusting the particular external parameters.

The comparison members 110 and 111, aside from their signal output to the subsequently connected AND-gates 122 and 123, additionally give off signals to the first or third AND-gates 103 or 105 connected therebefore. The inputs of two memory flip-flops 124 and 125 are connected to the output of the one AND-gate 121, while the inputs of the two memory flip-flops 124 or 125 are connected with the outputs of the two AND-gates 122 and 123.

The outputs of these two memory flip-flops 124 and 125 on the other hand are connected by way of two opto-couplers 126 and 127 as well as two amplifiers 128 and 128 respectively with the magnet 23 for the gas outlet valve, or the magnet 22 for the liquid flow valve of the filling element.

With this arrangement, the following manner of operation is attained:

As already set forth, the operating cycle of each filling element group occurs in such a manner that sequentially the operating condition for each filling element is ascertained in individual cycle phases. Time data are preset for the filling elements of all groups, and these time data are valid respectively for the processing of one filling element, selectively for one operating cycle. Hereby the following three time-data-blocks are preset by way of the rated value members 112, 113, 114:

$B_1$ (rated value member 112) = time from start of filling until beginning of rapid filling;

$B_2$ (rated value member 113) = time from start of filling until end of rapid filling;

$B_3$ (rated value member 114) = time from occupying or covering of the probe until closing of the filling element.

These times are set analogically at the potentiometers 118, 119, 120, and are converted into hexa-decimal-signals by way of the analog-digital-converters 115, 116, 117. The operational sequence of a filling element corresponds to one timing pulse for this filling element. After passing through one working cycle, the next timing pulse is given at the renewed processing of this filling element. The number of timing pulses in this case represents the time-actual value which is delivered or given off by the actual members 106, 107, 108. The measuring circuit of each filling element is hereby continuously in operation and is selected and questioned during the processing by way of the second portion 102 of the pulse generator 101, 102.

For a filling height correction, the probe 21 of a filling element 2 is short circuited by the liquid resistance 8 caused by the liquid flowing in when reading the predetermined filling height. The corrected filling height in the filling container is attained when, from attaining the predetermined filling height, the correction time predetermined by the electronic control unit and the advance or preset time of the rated value member 114 corresponding to the correction factor for the filling height have elapsed. At this time, the magnet 22 of the filling element 2 closes the liquid flow valve, so that with the liquid still running into the vessel, there is attained the actual filling height.

The potentiometer 33 arranged between the probe amplifier 31 and the correction amplifier 32 serves for the correction of inaccuracies in the filling behavior and for the correction of unavoidable tolerances of the electrical components in the measuring circuit associated with every filling element.

Figure 4:
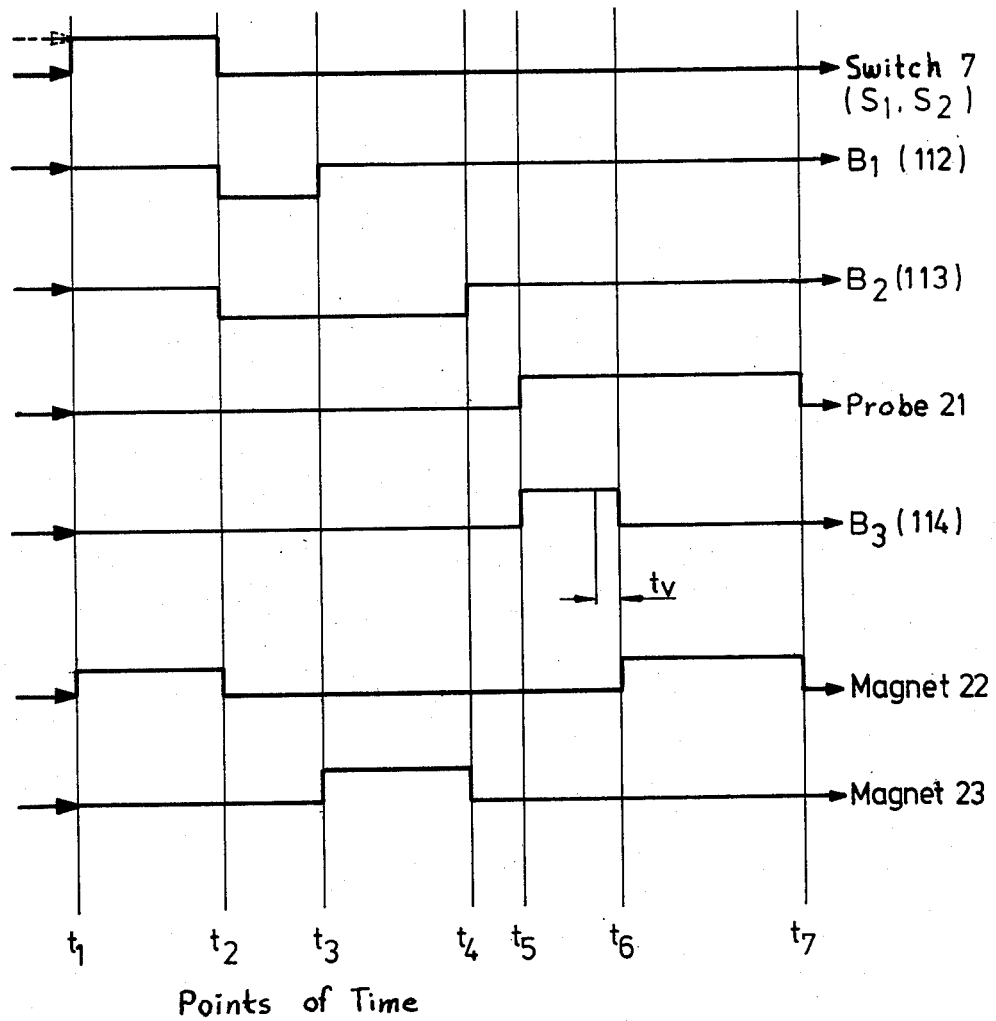
FIG. 4 is a chronological illustration of the individual method steps in connection with the control of an electrical filling element according to FIG. 3.

In FIG. 4, the function of the switching arrangement according to FIG. 3 is made clear on the basis of the chronological sequence of the filling process under a filling element. This representation shows the chronological course of the signals which are selected by the central electronic control unit for the evaluation and control processes.

At the point of time $t_1$, where the pressurizing zone is reached, the switch 7 is closed and accordingly the magnet 22 of the actuating device for the liquid flow valve is switched for holding the liquid flow valve effectively in the closed position. At the point of time $t_2$, where the pressurizing zone terminates and the pressurizing pressure is reached, the switch 7 is reopened, whereby the magnet 22 is switched to ineffective and the liquid valve is released for occupying the opening position. At the point of time $t_2$, simultaneously the magnet 23 for the gas outlet valve is switched on or made effective by way of the rated value member 112 with time delay, and additionally the rated value member 113 is prepared for switching off or making ineffective the magnet 23 within a predetermined time. At the point of time $t_3$, the magnet 23 which has been made effective or turned-on switches the gas outlet valve into the open position for rapid filling of the filling vessel. At the point of time $t_4$, where the preparation time of the rated value member 113 has elapsed, the magnet 23 is switched off or made ineffective, and the gas outlet valve is closed. At the point of time $t_5$, the predetermined filling height is reached by the liquid inside the filling vessel, so that the liquid resistance 8 covers or occupies the probe 21 and the advance time $t_v$ of the rated value member 114 including the time of the correction member 32, 33 is scanned. At the point of time $t_6$, the signal output occurs after expiration of the scanned time by way of the memory 125, the opto-coupler 127, and the amplifier 129 to the magnet 22 for closing the liquid flow valve. At the point of time $t_7$, the filling procedure is concluded after completion of the vessel venting, so that the vessel is withdrawn from the filling element. The probe covering or occupying is cancelled thereby, so that the filling element is ready for filling of a subsequent vessel, and the operating conditions are scanned or sought anew in the previously described manner.

The fixed-cycle control of the filling machine is divided into four portions: the measuring circuits, the output circuits, the parameters, and the central control unit. The measuring circuits for the signal emitters are analog circuits which are adjusted or set to the defined response resistances to cover, on the one hand, the conductivity range of most liquids, except distillates, while, on the other hand, to preclude to a high degree any response to foam. Measuring generally occurs with alternating current to preclude galvanic effects. The measured values are converted into switching signals and, decoupled galvanically by way of separating circuits, e.g. opto-couplers, are supplied to the electronic control unit. The output circuits are capacity amplifiers which receive their signals from the central control unit by way of separating circuits, likewise for example opto-couplers. The introduced parameters, which are essentially advance time signals, are analog voltage signals which are digitalized in the fixed-cycle control in conformity with FIG. 3 and are supplied by way of separating circuits to the central control unit. The switching signals, for instance the machine pulse, the synchronization pulse, and so forth, are likewise carried by way of separating circuits. The central electronic control unit is a calculator or computer in which logical and arithmetical operations are carried out according to a corresponding program. After expiration of all operations to be carried out in the program, there begins with a synchronization pulse the passage of a new program. In this manner the filling process for a filling vessel, which on the average lasts five seconds, is divided into approximately five hundred individual steps. With a filling quantity of five hundred milliliters, the filling accuracy amounts to one milliliter. Each program passage, which means every timing cycle, orients itself to the data generated by the preceding timing cycles and delivered in the operating or working memory.

Since in every filling-time range, which means the processing time for one filling vessel, five hundred timing cycles are traversed, there can respectively be used, as already stated, one timing cycle in definite time intervals for the transfer of information data about the operating condition of the filling elements from the timing cycle of the fixed-cycle control to form a closed control circuit, without essentially influencing the filling accuracy. In this manner there is possible a continuous data exchange between the rotating and the stationary parts of the filling machine. Consequently, it is possible to form a closed control circuit for one or more of the control devices associated with the filling machine in the stationary part or externally of the machine, including for instance regulators or pumps. In this manner, additionally suitable indicating means can represent or show the particular operating condition of the filling machine.

Figure 5:
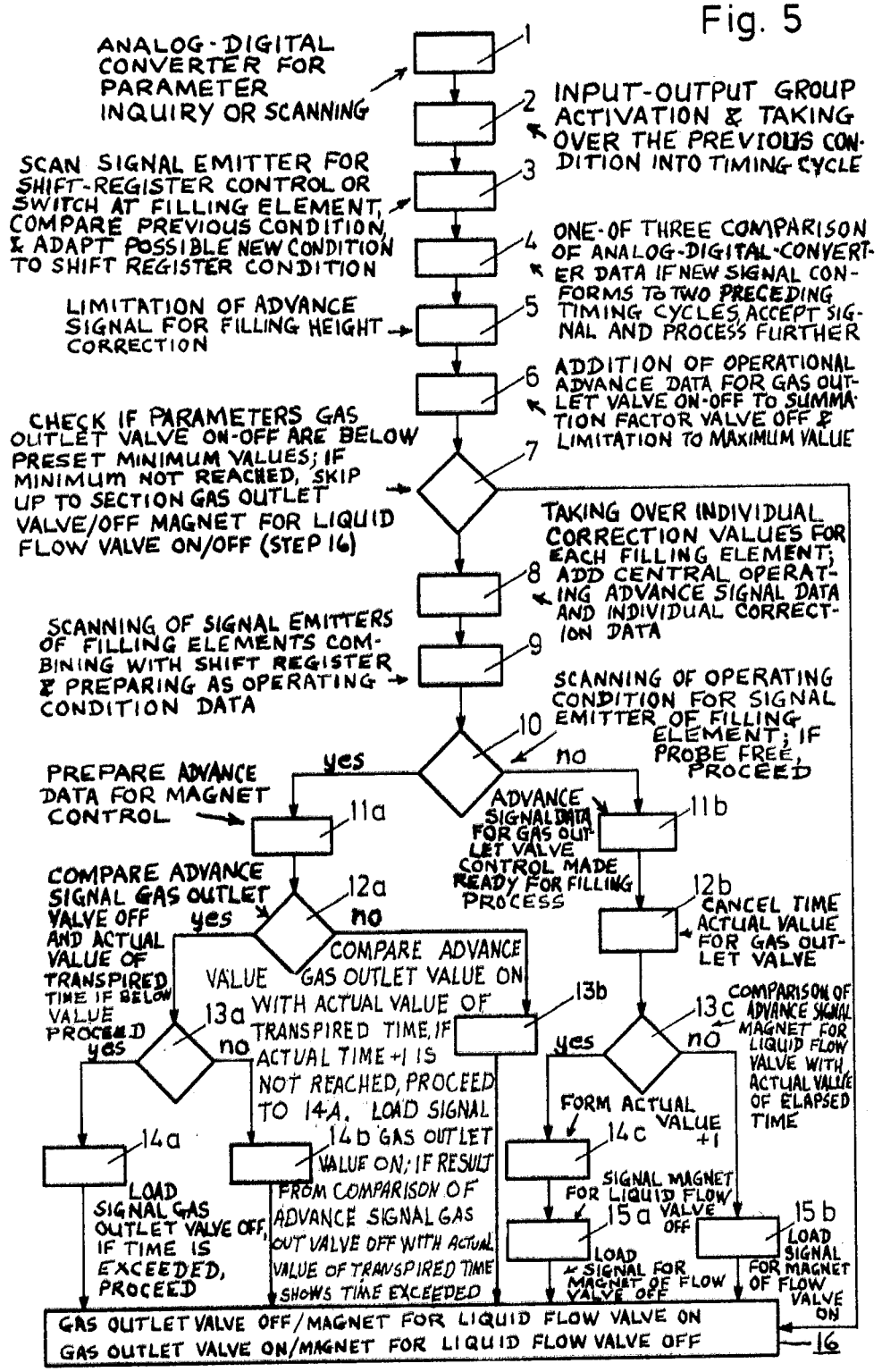
FIG. 5 is a flow diagram to illustrate the operations to be carried out during a timing cycle.

FIG. 5 schematically illustrates in a flow diagram the operations to be carried out within a timing cycle, and these operations are set forth below in detail:

1. Analog-digital converter for parameter inquiry or scanning;
2. Input-output group activation and taking over the previous condition into the timing cycle;
3. Scan the signal emitter for the shift-register control or the switch at the filling element, compare with the previous condition, and adapt a possible new condition to the shift-register condition;
4. A one-of three-comparison of the analog-digital-converter-data is undertaken; if the newly received signal conforms to the signals from the two preceding timing cycles, the signal is accepted and is further processed;
5. LImitation of the advance signal for the filling height correction;
6. Functional addition of the operational advance data for the gas outlet valve ON and gas outlet valve OFF to a summation factor for the gas outlet valve OFF and limitation to a maximum value;
7. Check whether the parameters "gas outlet valve ON" and "gas outlet valve OFF" are below the preset minimum values. If one of the minimum values is not reached, the further program skips all further functions up to the section "gas outlet valve OFF/magnet for liquid flow valve ON"; or, depending on which of the values has not been reached, up to the section "gas outlet valve ON/magnet for the liquid flow valve OFF" (STEP 16).
8. Taking over the individual correction values for each filling element either from a fixed value memory or from a range of the operating memory or storage means reserved for this purpose. Subsequently, linearly adding the central operating advance signal data and individual correction data.
9. Scanning of the signal emitters of the filling elements 1–8, combining with the shift register, and preparing as operating condition data.
10. Scanning of the operating condition for the signal emitter of the filling element 1. If the probe is free, proceed as follows:
11a. Prepare advance data for magnet control; and
12a. Carry out comparison between the advance signal gas outlet valve OFF and the actual value of the transpired time. If the elapsed time is below the value, proceed as follows:
13a. Compare the advance value "gas outlet valve ON" with the actual value of the transpired time. If the actual time +1 is not reached, proceed as follows:
14a. Load signal "gas outlet valve OFF"; if the time is exceeded proceed as follows:
14b. Load the signal "gas outlet valve ON". If the result from the comparison of the advance signal "gas outlet valve OFF" with the actual value of the transpired time shows that the time was exceeded, proceed as follows:
13b. Cancel time-actual value for the magnet of the liquid flow valve and load the signal "gas outlet valve OFF". If the result from the inquiry about the operating condition of the signal emitter of the filling element 1 shows that the signal emitter is occupied, there follows:
11b. Advance signal data for the gas outlet valve control is made ready for the subsequent filling process; and
12b. Cancel time-actual value for the gas outlet valve.
13c. Carry out the comparison of advance signal magnet for the liquid flow valve 1 with the actual value of the elapsed time; if this actual value is not reached there follows:
14c. Form actual value +1 and load signal magnet for liquid flow valve OFF. If the actual value of the transpired time is exceeded, there follows:
15b. Load signal for the magnet of the liquid flow valve ON. Subsequently, the filling elements 2,3 and 4 are processed in the same manner, and the discharge elements for the valves 1–4 are loaded with the corrected signals. Thereupon the filling elements 5–8 are likewise processed in the same manner, and the signal emitters of the filling elements 9–16 are scanned.

After all filling elements have been processed, the calculator or computer goes into a holding state, which is terminated when a cycle-synchronous pulse arises independent of the program length which triggers the beginning of the new timing cycle beginning with step 1. If more filling elements are to be controlled than can be processed in one group, one group is operated as a lead- or guide-calculator or computer, and the further groups are respectively operated as follower or satellite calculators or computers.

The block circuit diagram in FIG. 6 shows schematically such a group arrangement with lead- and follower-calculators or computers.

The lead calculator or computer 12.1 is connected with a pulse generator 11.1 as well as reciprocally with a fixed value memory (PROM) and a random access memory (RAM) encompassing memory range 13.1, as well as an input-output control 15.1. The input-output control 15.1 is connected on the input and output sides with the signal emitters and control magnets of the filling elements $E_1$ and $A_1$ of the group. Furthermore, the input-output control 15.1 is connected with a parameter member 4, with the two signal emitters $S_1$ and $S_2$ arranged in the stationary part of the filling machine, with the signal emitter $S_3$ installed in the liquid container, as well as on the output side with an indicator unit 17. Additionally, synchronization signals are given off to the follower computer 12.2 by the input-output control 15.1. The follower computer 12.2 is likewise connected with a pulse generator 11.2 as well as reciprocally with a memory range 13.2 which likewise includes a PROM (fixed value storage or memory) and RAM (random access memory) and an input-output control 15.2. This input-output control 15.2 is connected to the signal emitters and control magnets of further filling elements $E_2$ and $A_2$ of the group. Additionally, data from the follower calculator or computer are transmitted from the input-output control 15.2 to the memory range 13.1 of the lead calculator or computer. Data from the lead computer 12.1 in turn are given off to the memory range 13.2 of the follower calculator or computer 12.2. All parameters and external condition signals from the lead computer 12.1 are taken over by the follower computer 12.2 with the synchronization pulse so that in the follower computer 12.2 the first program segment is not required as previously set forth.

The follower and lead computers are synchronously started. The program cycle times are shorter than the respective sequence of the synchronization pulses subject to maintaining a safety interval. In the framework of a continuous data exchange between lead computer and follower computer, the holding state of the lead computer introduced after program termination is interrupted upon command of the follower computer in order to take over results from the follower computer. Depending on the type of filling machine, at the end of the lead-computer-holding state, results are transferred to the stationary part of the filling machine and, if wanted, are indicated on a data viewing device 17.

The type and manner of processing the individual filling elements, as well as the data exchange between the lead computer and the one or more follower computers, as well as between the rotating and the stationary parts of the filling machine, is not limited to the illustrated embodiment. Also, the sensitivity of the control and regulation can be adapted to the particular requirements, and further system parts, including the closure machine and the like, can be included in the fixed-cycle control, and with filling materials having little or no conductivity, for example alcoholic beverages, signal emitters in the form of probes can be used which operate according to the heat-tone or thermal effect.

During the preparatory operation of the filling machine for pressurizing the liquid container, during which time the liquid flow valves of all filling elements must be closed in order to avoid liquid losses during the filling of the liquid container with filling material, the data block $B_2$ is turned-off by a corresponding signal, and a program segment is selected which fulfills the requirement that all liquid flow valves close. This condition is maintained independently of any time influences until the data block $B_2$ is switched on again for the operational sequence "filling operation".

The present invention is, of course, in no way restricted to the specific disclosures of the specification and drawings, but also encompasses any modifications within the scope of the appended claims.

What I claim is:

1. An arrangement for controlling a bottle filling machine having a stationary part, a rotating part provided with filling elements, each filling element having operatively associated therewith at least one valve and one signal emitter, the latter being actuated by the filling material rising in a container which is briefly pressed onto the respective filling element for filling purposes, comprising:

a registering and storage device which is synchronously connected step-for-step with the circulation path of said rotating part of said filling machine in the manner of a shift register, and which has a number of register locations and storage means which are at least adjustable to the number of filling elements in circulation;

a sensing device arranged on said rotating part of said filling machine and provided with feeler elements which respond to breakage of a container to be filled, and enter an appropriate marking in said registering and storage device;

a discharge element for discharging containers from said filling machine;

an ejection device located in the region of said discharge element which, when actuated, ejects a container from a row of containers leaving said filling machine;

a counting chain of relays with that number of counting locations having storage elements which corresponds to an integral multiple of the number of filling elements in circulation, increased by the necessary advancing steps between the arrangement of said sensing device and said ejection device, said counting chain of relays being connected to said registering and storage device for taking over information; and a switching device, said counting chain of relays being connected to said switching device for emitting switching pulses in the advancing step spacing between said sensing and ejection devices, said switching device serving to actuate said ejection device.

2. An arrangement according to claim 1, further including:

signal emitters associated with said stationary part of said filing machine;

signal emitters associated with said filling elements;

adjusting members associated with said stationary and rotating parts of said filling machine and connected to said electronic control unit; and a fixed-cycle control for said electronic control unit, all of said signal emitters being connected with said fixed-cycle control.

3. An arrangement according to claim 2, in which said filling elements include liquid flow valves, and said filling machines include further control valves, said electronic control unit, for determination of condition and changing of condition of said filling elements, being connected with said liquid flow valves and selectively with said further control valves.

4. An arrangement according to claim 3, which includes: a regulator connected to said electronic control unit by means of two-way data channels; an operating data emitter connected to the input side of said regulator; and an adjustment member selectively connected to the output side of said regulator.

5. An arrangement according to claim 4, which includes a parameter input member, said adjustment member being connected with said electronic control unit by means of said parameter input member to preset determinable individual parameters or constants.

6. An arrangement according to claim 5, which includes at least one signal emitter for all filling elements arranged in common in said stationary part of said filling machine, said signal emitter transmitting a signal relating to the filling condition to a measuring section formed by at least two signal emitters.

7. An arrangement according to claim 6, which includes at least one signal emitter, arranged at each filling element in said rotating part of said filling machine, which is responsive to filling conditions and projects into the container which is to be filled and which is briefly pressed onto said filling element.

8. An arrangement according to claim 7, in which the measuring points of said signal emitter in said stationary part of said filling machine are dependent upon the rotational speed of said rotating part of said filling machine.

9. An arrangement according to claim 8, in which said signal emitters associated with the individual filling elements in the rotating part of said filling machine are at least one of an independent measuring section and reference points of an integrated measuring section.

10. An arrangement according to claim 9, in which said signal emitters are probes selected from the group consisting of conductivity probes, probes for continuous measurement of the filling level, and probes which operate according to thermal effect.

11. An arrangement according to claim 9, in which those control elements which determine the final filling level comprise time delay members.

12. An arrangement according to claim 2 in which every signal emitter influencible by the filling material is connected by way of a measuring circuit with said electronic control unit, and which includes a further signal emitter and a frequency generator intended for all measuring circuits of the filling elements which are connected to said measuring circuit.

13. An arrangement according to claim 12, which includes an opto-coupler for connecting not only the respective measuring circuit, but also the actuating device of the valves of said filling elements, with said electronic control unit.

* * * * *